United States Patent [19]
Ebringer

[11] Patent Number: 6,084,852
[45] Date of Patent: Jul. 4, 2000

[54] BURST MODE PREAMBLE

[75] Inventor: Lawrence Ebringer, San Francisco, Calif.

[73] Assignee: Next Level Communications, Rohnert Park, Calif.

[21] Appl. No.: 08/728,947

[22] Filed: Oct. 11, 1996

Related U.S. Application Data

[60] Provisional application No. 60/005,444, Oct. 12, 1995, abandoned.

[51] Int. Cl.[7] .................................................. H04J 3/06
[52] U.S. Cl. ........................ 370/206; 370/504; 370/514
[58] Field of Search ................................. 370/206, 478, 370/480, 482, 485–487, 503, 509, 513, 514, 504

[56] References Cited

U.S. PATENT DOCUMENTS

| | | | |
|---|---|---|---|
| 4,074,230 | 2/1978 | Icenbice, Jr. .............................. | 375/267 |
| 4,290,143 | 9/1981 | Wissel et al. ........................... | 455/38.1 |
| 5,387,927 | 2/1995 | Look et al. ............................. | 370/395 |
| 5,553,064 | 9/1996 | Paff et al. ................................ | 348/10 |
| 5,574,788 | 11/1996 | Childress et al. ........................ | 455/17 |

OTHER PUBLICATIONS

*Digital Communications, Fundamentals and Applications*, Bernard Sklar (Prentice–Hall, New Jersey, 1988) pp. 460–464.

*Primary Examiner*—Chau Nguyen
*Attorney, Agent, or Firm*—J.P. Blasko Professional Corp.; John P. Blasko; Charles A. Eldering

[57] ABSTRACT

In a burst mode communications system, bursts of information with a known preamble are transmitted from a burst mode transmitter and are received by a burst mode receiver which uses the preamble to determine the presence of a burst and to determine the correct carrier frequency, carrier phase, symbol clock frequency and symbol clock phase in order to correctly recover the symbols transmitted, and thus the information contained within the burst. The present invention comprises a method of burst transmission using a preamble which contains an initial pulse and a Barker sequence following the initial pulse separated by a dead time period equal to the transmission time of at least one symbol. The preamble can be transmitted on orthogonal carriers and the order of the Barker sequence can be reversed and multiplied by minus one on one of the carriers to reduce the probability that noise events on both carriers make the Barker sequence less detectable on each channel.

12 Claims, 5 Drawing Sheets

TABLE I
I AND Q VALUES IN PREAMBLE

| I | Q |
|---|---|
| 1 | 1 |
| 0 | 0 |
| 0 | 0 |
| 1 | -1 |
| 1 | 1 |
| 1 | -1 |
| 1 | 1 |
| 1 | -1 |
| -1 | -1 |
| -1 | 1 |
| 1 | 1 |
| 1 | -1 |
| -1 | -1 |
| 1 | -1 |
| -1 | -1 |
| 1 | -1 |

FIG. 5

BURST MODE PREAMBLE

CROSS-REFERENCES

This application claims the benefit of U.S. Provisional Application No. 60/005,444 filed on Oct. 12, 1995, entitled "Preamble for Burst Mode Reception," now abandoned.

BACKGROUND

Burst mode transmitters generally need to transmit a training sequence or preamble prior to the transmission of data so that a burst mode receiver can obtain the correct clock sample phase and carrier phase to recover the data. There is a need for a short preamble which contains the maximum amount of information regarding the burst and which can effectively be used by a number of different types of burst mode receivers to detect the presence of the burst and to recover clock sample phase and carrier phase.

SUMMARY OF THE INVENTION

In a burst mode communications system having a burst mode transmitter using Quadrature Phase Shift Keying modulation, bursts containing a preamble and data are transmitted by first transmitting a pulse of one to three symbols in length, waiting during a dead time of one to three symbols in length during which time no symbols are transmitted, transmitting a Barker sequence of at least seven bits in length in both the I and Q channels, and transmitting the data.

To reduce the effect of the noise on the Barker sequence, the sequence can be reversed and inverted in the I and Q channels such that the I channel contains a Barker sequence and the Q channel contains the same Barker sequence in reverse order and multiplied by minus 1.

An advantage of the present invention is that many different types of burst mode receivers can be used to detect the burst and recover the transmitted data based on a short preamble.

BRIEF DESCRIPTION OF THE DRAWINGS

FIG. 5 illustrates a table representing the symbol values in the preamble.

DESCRIPTION OF PREFERRED EMBODIMENTS

I. Introduction

Figure 1:
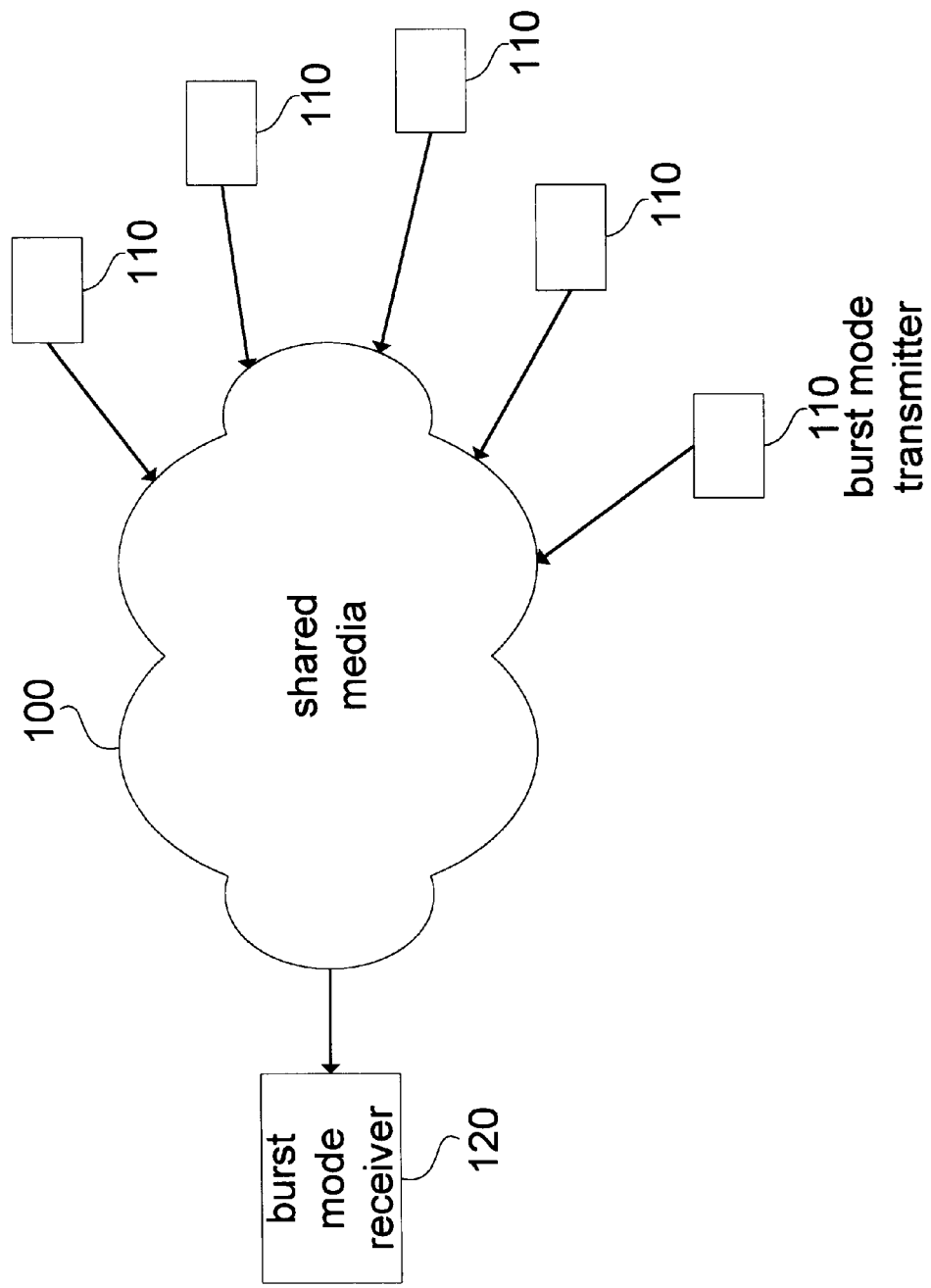
FIG. 1 represents a shared media with multiple burst mode transmitters and a single burst mode receiver.

The general form of a burst mode communications system is illustrated in FIG. 1, and is formed when multiple burst mode transmitters 110 transmit signals over a shared media 100 which are received by a burst mode receiver 120. The shared media can be of a multitude of forms including free space, twisted pair copper cable in a bus configuration, a passive optical network, or a shared coaxial cable network comprised of coaxial cable and splitters. Examples of applications using shared media include local area networks, cellular phone systems, and bi-directional cable TV systems.

Figure 2:
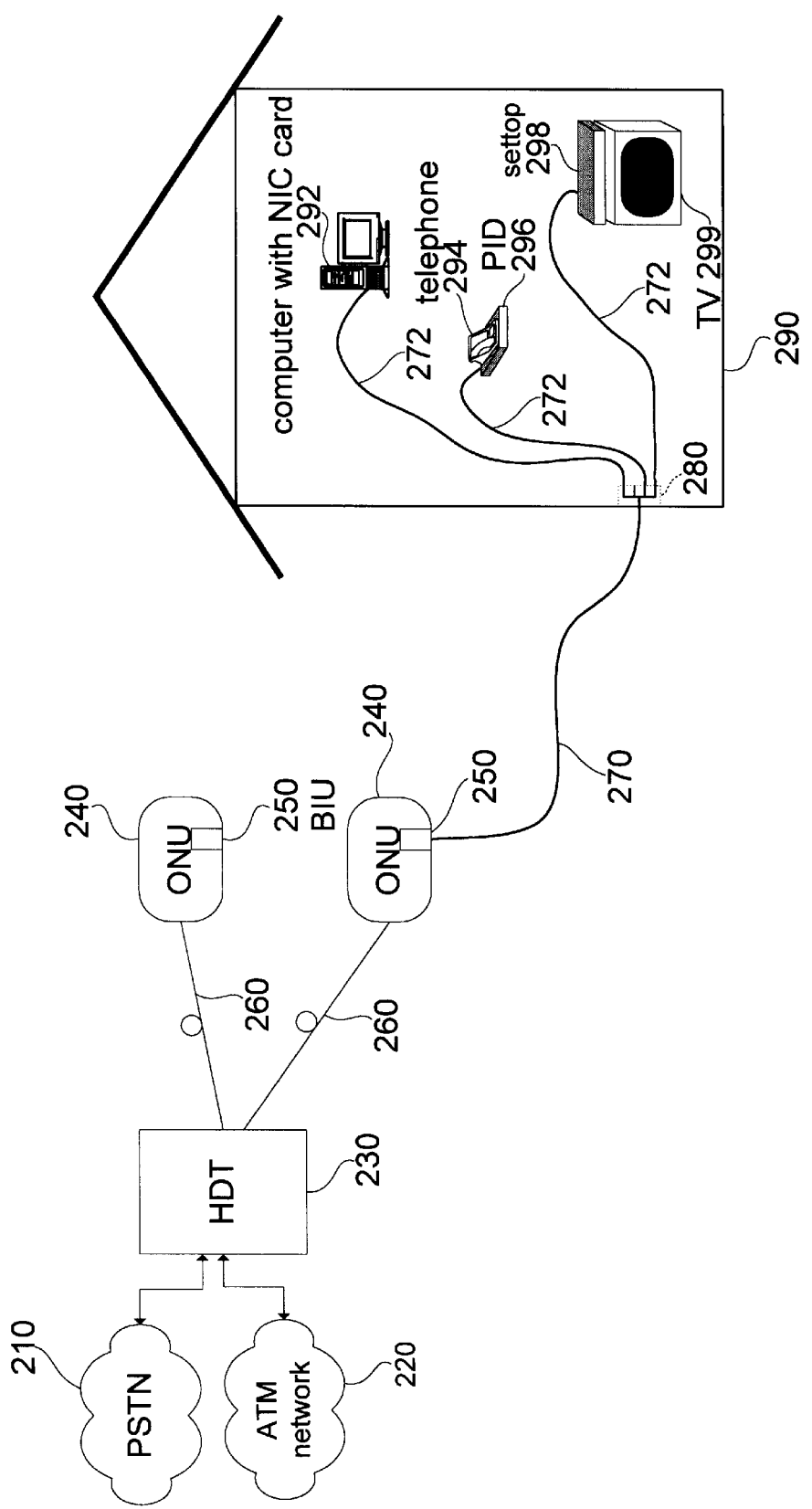
FIG. 2 illustrates a Fiber-to-the-Curb (FTTC) network with a coaxial drop cables to the residence which provides connectivity to a number of devices in the residence and over the shared media formed by the coaxial drop cable, splitter, and in-home coaxial wiring.

FIG. 2 illustrates a Fiber to the Curb (FTTC) network with a subscriber coaxial cable network which forms a shared media. In the FTTC network illustrated, a Host Digital Terminal (HDT) 230 is connected to the Public Switched Telecommunications Network (PSTN) 210 as well as an Asynchronous Transfer Mode (ATM) network 220, and to one or more Optical Network Units (ONUs) 240 via optical fiber 260. A Broadband Interface Unit (BIU) 250 in ONU 240 contains transmit and receive circuits for sending signals to devices in a residence 290.

The devices in the residence 290 are connected to BIU 250 via a subscriber coaxial cable network, which when used herein, is defined as a network comprised of a coaxial drop cable 270, splitter 280, and in-home coaxial wiring 272 which connects and individual residence 290 to the BIU 250. Use of the term subscriber indicates that the customer in the residence is a subscriber or potential subscriber to the services provided over the FTTC telecommunications network. The subscriber coaxial cable network forms a shared media since it allows all devices connected to it to access the BIU 250 with no active switching.

As shown in FIG. 2, examples of the types of devices which can be present in the residence 290 include a telephone 294 connected to a Premise Interface Device (PID) 296, a computer containing a Network Interface Card 292 and a television 299 with a settop 298. The computer containing a NIC card 292, PID 296, and settop 298 can, via the in-home coaxial wiring 272, splitter 280, and coaxial drop cable 270, all transmit signals to the BIU 250.

II. Burst mode communications in a FTTC system

In the FTTC system digital signals are used to carry voice, video, and data signals to the devices. Asynchronous Transfer Mode (ATM) protocols and formats can be used to carry the signals. The system requires bi-directional communications between the devices in the residence 290 and the ONU 240, and information is transmitted in the return direction, for example, from the devices to the ONU 240 for changing channels on the television 299, carrying out voice conversation on the telephone 294, or using network services on the computer with NIC card 292. The system provides for the transport of ATM cells in the return direction as well as the forward (ONU to devices) direction.

The shared media formed by the subscriber coaxial network suggests that the devices use a multiple access protocol to transmit to the BIU 250 in the ONU 240. A number of multiple access protocols can be used including Frequency Division Multiple Access (FDMA), Code Division Multiple Access (CDMA) and Time Division Multiple Access (TDMA). When a TDMA protocol is used the devices will be assigned opportunities for the transmissions to the BIU 250, and, when ATM protocols are used, will transmit one or more cells in the opportunities.

Although signals can be transmitted on the subscriber coaxial cable network in baseband form when the splitter 280 has the appropriate low frequency characteristics, it is generally more appropriate to transmit signals in both the forward and return direction on passband signals which are centered about some non-zero frequency.

Figure 3:
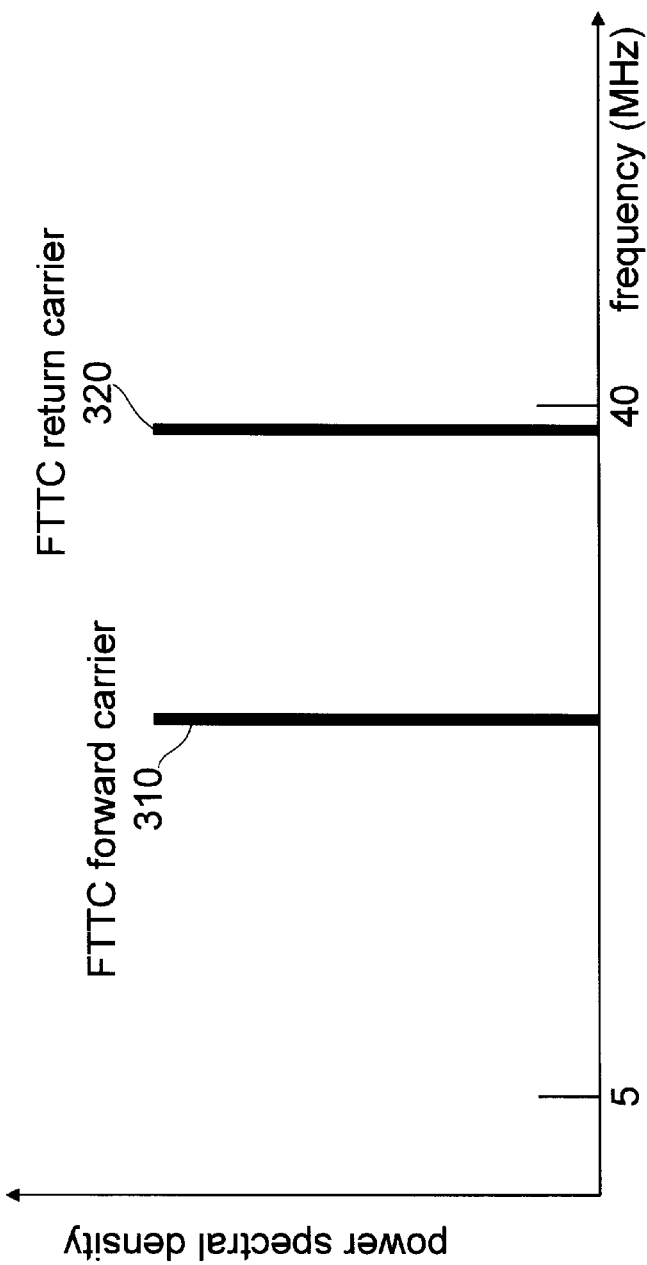
FIG. 3 illustrates a spectrum of forward and return signals on the coaxial drop in a FTTC network.

FIG. 3 illustrates a possible spectrum of forward and return signals on a subscriber coaxial network, with a FTTC forward carrier 310, and a FTTC return carrier 320. In one embodiment of an FTTC system, the forward transmission takes place on a FTTC forward carrier 310 at a frequency of 19.44 MHz, with a data rate of 51.84 Mb/s using 16 Quadrature Amplitude Modulation (16 QAM). Transmissions in the return direction can take place on a FTTC return carrier 320 at a frequency of 38.88 MHz, with a data rate of 19.44 Mb/s using Quadrature Phase Shift Keying (QPSK). An advantage of this embodiment is that the spectrum of TV signals above 50 MHz is not disturbed by these transmissions, if such an analog signal is present on the subscriber coaxial network. However, this embodiment is given as an example only, and various frequencies, data rates and modulation formats could be used to practice the invention. It should also be noted that techniques which are commonly referred to as Carrierless Amplitude/Phase (CAP) modulation are subsequent to generation of the signal, equivalent to QPSK and QAM modulation formats.

III. Preamble for burst mode communications

Figure 4:
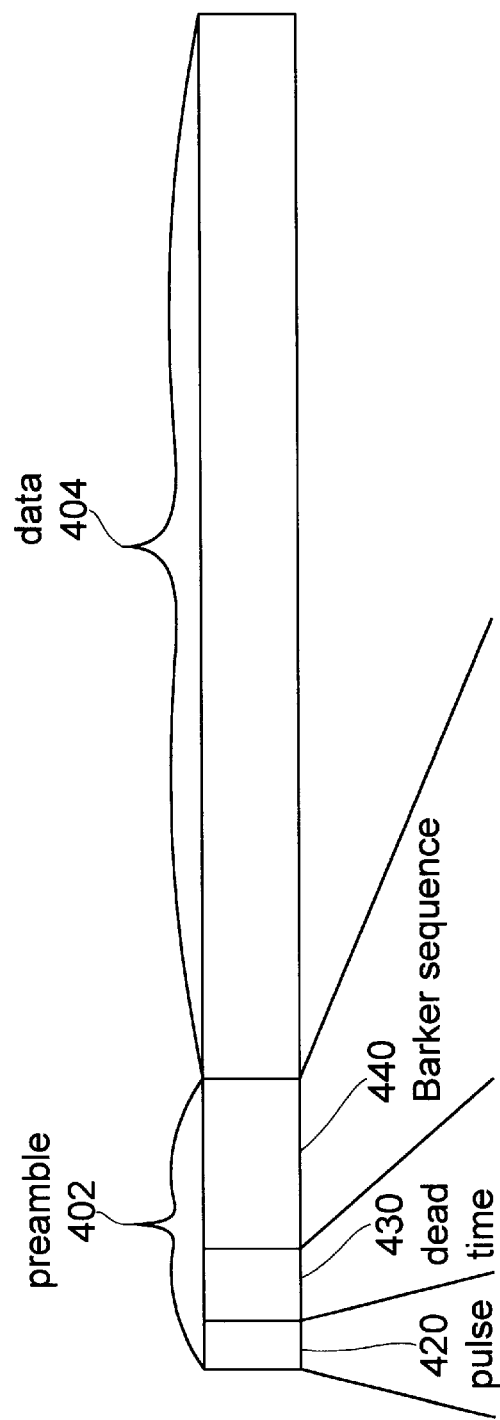
FIG. 4 illustrates the format of a burst transmission.

FIG. 4 illustrates the structure of a burst for burst mode transmission. It can be received using a number of methods, and consists of a preamble 402 followed by data 404. The preamble has a pulse 420, a dead time 430, and a Barker sequence 440.

The Barker sequence is used in a preferred embodiment of the invention because it has low crosscorrelation and high autocorrelation properties. In the preferred embodiment, the transmitter utilizes Quadrature Phase Shift Keying (QPSK) modulation in which binary symbols are modulated on to orthogonal carriers, referred to as the I and Q channels. The carriers can be thought of as having different frequencies in the sense that the complex representation of the orthogonal carriers are different even when the real value of the frequency is the same. The Barker sequence, consisting of 1–13 bits, can be transmitted in the preamble on both carriers.

Because noise on the orthogonal carriers can be correlated, there can be a correspondence between errors in the detected signal at the burst mode receiver. To reduce the probability that noise events on both carriers make the Barker sequence less detectable on each channel, the order of the Barker sequence can be reversed in one channel with respect to the other channel. To further reduce the effect of correlated noise events, the Barker sequences in the I and Q channels can be inverted with respect to each other as well as transmitted in different transmission sequences in the I and Q channels. As an example, the Barker sequence can be transmitted from beginning to end in the I channel, and in inverted form from end to beginning in the Q channel.

FIG. 5 illustrates the preamble sequence of an embodiment which is comprised of a binary '1' in both the I and Q channels, followed by a dead time of two symbols during which time no signal is transmitted, followed by a Barker sequence of 13 bits in the I channel, and the same Barker sequence reversed and inverted in the Q channel.

One skilled in the art will recognize that a Barker sequence may be modified without substantially altering its cross-correlation or autocorrelation properties. It is also recognized that a Barker sequence may comprise more than one Barker codeword, and in one embodiment a 13 bit Barker codeword is repeated twice to form the Barker sequence. In a preferred embodiment of the preamble, the initial pulse and dead time are followed by a 13 bit Barker codeword which is subsequently followed by a binary sequences which are different for the I channel and the Q channel. In a preferred embodiment the preamble is

I=1 0 0 1 1 1 1 1 -1 -1 1 1 -1 1 -1 1 1 1 1 1 1 1 1 1

Q=1 0 0 -1 1 -1 1 -1 -1 1 1 -1 -1 -1 -1 -1 1 1 1 -1 1 -1 1 -1.

The number of ones in the pulse 420 can vary with a single occurrence of a one being the obvious minimum for being able to detect the presence of a pulse in a receiver. More than a single '1' can be transmitted but may cause unnecessary lengthening of the preamble. By transmitting a one in both the I and Q channels it is possible to use a power measurement at the receiver to detect the presence of the pulse. Since carrier recovery has not typically occurred when the pulse arrives, only a power measurement is possible, and the use of a one in both the I and Q channel allows a noncoherent power measurement to be used to detect the pulse.

The dead time 430 is provided to prevent precursors which may be formed in the filtering of the Barker sequence 440 in a burst mode receiver 120 from interfering with the reception and detection of the pulse 420, and visa versa.

Data is subsequently transmitted in the form of binary symbols modulated onto the orthogonal carriers using QPSK modulation.

In another aspect, the invention comprises a burst mode transmitter for use in a burst mode communications system. The burst mode transmitter is capable of generating bursts for transmission to a burst mode receiver. The burst mode transmitter circuitry for producing burst signals in general are known in the art. The bursts of the present invention comprise a preamble and data which are coded into binary symbols and modulated onto a first carrier frequency and a second carrier frequency wherein said second carrier frequency is orthogonal to said first carrier frequency as described above. The preamble consists of a sequence of a data pulse followed by a Barker sequence. The data pulse and Barker sequence are separated by a transmission time period equivalent to the transmission period of at least one, preferably two, binary symbols.

The burst mode signal is transmitted over a shared media, and received by a burst mode receiver which uses the preamble to determine the presence of a burst and to determine the correct carrier frequency, carrier phase, symbol clock frequency and symbol clock phase in order to correctly recover the symbols transmitted, and thus the information contained within the burst.

As an example of a method of recovering a burst mode signal is the use of a cross-coupled fractionally spaced equalizer structure which is preceded by an initiator circuit which detects the presence of pulse 420 and uses the Barker sequence 440 for adjustment of the taps of the equalizer for clock and carrier phase recovery.

Reception of the burst mode signal can be accomplished by converting a received analog signal to a digital signal and downconverting the digital signal to a baseband signal having an I channel and a Q channel with at least two samples per symbol. The presence of a burst is determined by examining the squared values of at least three samples and determining, through the use of at least one threshold, if a burst is present, and if so, which of the samples is nearest to the center of a predetermined symbol in the preamble.

The signals in the I and Q channels are passed through digital filters which have taps which can be adjusted to minimize an error signal which is produced by a subsequent decision circuit which performs thresholding of the filtered samples and makes determinations of the symbol values and correlates the recovered symbols with a stored version of the predetermined preamble during training mode, or with the samples prior to thresholding during normal operation mode. The correlation produces an error signal which during the training mode represents the initial error while the filters are being adjusted to obtain the proper symbol sampling phase and minimize the carrier phase offset, and which during normal mode of operation represents the drift in the symbol sampling and carrier phases. Minimizing this error signal during the training phase results in symbol sampling phase recovery and carrier phase acquisition, and during the normal mode of operation resulting in a tracking of the symbol and carrier phases.

The preceding description of a method and receiver architecture for burst mode reception is given as an example only, and alternative architectures for burst mode receivers are possible.

Although the present invention has been described in considerable detail with reference to certain preferred versions thereof, other versions are possible. The goal of the invention as a method and apparatus for the transmission of burst mode data remains the same however. An application of the invention is the transmission of data transmitted from a burst mode device located in a residence 290, an example of which is a settop 298 connected to a television 299, to a BIU 250 in an ONU 240 of a FTTC system. In this application a subscriber may perform a channel change operation or other video related function through the remote control of a settop. This information is transmitted in the form of a burst from the settop 298 to the BIU 250, to the ONU 240, and to the HDT 230, which may effect the change or request another network element of the ATM network 220 to effect the change. The ability to transmit bursts from the settop 298 and be correctly received by a burst mode receiver is essential to correctly interpret the subscriber commands. Therefore the spirit and scope of the appended claims should not be limited to the description of the preferred versions contained herein.

What is claimed is:

1. In a burst mode communications system having a burst containing a predetermined preamble and data which are coded into binary symbols and modulated onto an I channel and a Q channel of a carrier frequency, a method for transmitting said burst comprising:

a) transmitting at least one symbol indicating a binary one on said I channel and at least one symbol indicating a binary one on said Q channel;

b) subsequently waiting a period of at least one symbol during which time no symbols are transmitted; and c) subsequently transmitting a binary Barker sequence having a beginning and an end on said I channel and simultaneously transmitting said binary Barker sequence having said beginning and said end on said Q channel;

d) subsequently transmitting said data in the form of binary symbols modulated onto said I channel and said Q channel.

2. The method of claim 1, wherein said Barker sequence has a length of between seven and twenty six bits.

3. The method of claim 1, wherein said Barker sequence is transmitted from said beginning to said end on said I channel and is simultaneously transmitted from said end to said beginning on said Q channel.

4. The method of claim 2, wherein said Barker sequence is transmitted from said beginning to said end on said I channel and is simultaneously transmitted from said end to said beginning on said Q channel.

5. The method of claim 1, wherein said Barker sequence is transmitted from said beginning to said end on said I channel and is simultaneously transmitted from said end to said beginning and inverted in sign on said Q channel.

6. The method of claim 2, wherein said Barker sequence is transmitted from said beginning to said end on said I channel and is simultaneously transmitted from said end to said beginning and inverted in sign on said Q channel.

7. A burst mode communications system comprising a burst mode transmitter, a burst mode receiver, and a transmission medium between said burst mode transmitter and said burst mode receiver, wherein bursts are transmitted from said burst mode transmitter to said burst mode receiver and said bursts comprise a preamble and data which are coded into binary symbols and modulated onto an I channel and a Q channel of a carrier frequency, and wherein said preamble comprises a sequence of a data pulse followed by a Barker sequence, said data pulse and Barker sequence being separated by a transmission time period equivalent to the transmission period of at least one binary symbol.

8. The burst mode communications system of claim 7, wherein the Barker sequence has a length of between seven and twenty six bits.

9. The burst mode communications system of claim 7, wherein the Barker sequence comprises a thirteen bit Barker codeword.

10. A burst mode transmitter for use in a burst mode communications system, said burst mode transmitter comprising a means for generating bursts for transmission to a burst mode receiver, said bursts comprising a preamble and data which are coded into binary symbols and modulated onto an I channel and a Q channel of a carrier frequency, and wherein said preamble comprises a sequence of a data pulse followed by a Barker sequence, said data pulse and Barker sequence being separated by a transmission time period equivalent to the transmission period of at least one binary symbol.

11. A burst mode transmitter of claim 10, wherein the Barker sequence has a length of between seven and twenty six bits.

12. A burst mode transmitter of claim 10, wherein the Barker sequence comprises a thirteen bit Barker codeword.

* * * * *